(12) United States Patent
Leem et al.

(10) Patent No.: US 9,298,552 B2
(45) Date of Patent: Mar. 29, 2016

(54) USING READ VALUES FROM PREVIOUS DECODING OPERATIONS TO CALCULATE SOFT BIT INFORMATION IN AN ERROR RECOVERY OPERATION

(71) Applicant: Intel Corporation, Santa Clara, CA (US)

(72) Inventors: Lark-Hoon Leem, East Palo Alto, CA (US); Xin Guo, San Jose, CA (US); Ravi H. Motwani, San Diego, CA (US); Rosanna Yee, Vancouver (CA); Scott E. Nelson, Vancouver (CA)

(73) Assignee: INTEL CORPORATION, Santa Clara, CA (US)

( * ) Notice: Subject to any disclaimer, the term of this patent is extended or adjusted under 35 U.S.C. 154(b) by 91 days.

(21) Appl. No.: 14/040,554

(22) Filed: Sep. 27, 2013

(65) Prior Publication Data

US 2015/0095736 A1    Apr. 2, 2015

(51) Int. Cl.
*H03M 13/00* (2006.01)
*G06F 11/14* (2006.01)
*G06F 11/10* (2006.01)

(52) U.S. Cl.
CPC .......... *G06F 11/141* (2013.01); *G06F 11/1012* (2013.01)

(58) Field of Classification Search
CPC ............ G06F 11/1412; G06F 11/1044; G06F 11/1068; G06F 11/00; G06F 11/1048; H03M 13/1102; H03M 13/2927; H03M 13/2906; H03M 13/3769; H03M 13/1111; H03M 13/1125; H03M 7/42; H03M 13/00; H03M 13/45; G11C 8/20; G11C 27/005; G11C 11/5642; G11C 11/56
See application file for complete search history.

(56) References Cited

U.S. PATENT DOCUMENTS

| | | | |
|---|---|---|---|
| 7,656,707 B2 | 2/2010 | Kozlov | |
| 7,814,401 B2 | 10/2010 | Alrod et al. | |
| 8,301,979 B2 | 10/2012 | Sharon et al. | |
| 2010/0088575 A1 | 4/2010 | Sharon et al. | |
| 2010/0165730 A1* | 7/2010 | Sommer et al. | 365/185.03 |
| 2011/0029718 A1 | 2/2011 | Frickey, III et al. | |

(Continued)

OTHER PUBLICATIONS

Cai, Y., et al., "Threshold Voltage Distribution in MLC NAND Flash Memory: Characterization, Analysis, and Modeling", Proceedings of the Conference on Design, Automation and Test in Europe, 2013, 6 pp.

(Continued)

*Primary Examiner* — Guerrier Merant
(74) *Attorney, Agent, or Firm* — Konrad Raynes Davda & Victor LLP; David W. Victor

(57) ABSTRACT

Provided are an apparatus, system, and method for performing an error recovery operation with respect to a read of a block of memory cells in a storage device. A current iteration of a decoding operation is performed by applying at least one reference voltage for the current iteration to a block of the memory cells in the storage device to determine current read values in response to applying the reference voltage. A symbol is generated for each of the read memory cells by combining the determined current read value with at least one value saved during the previous iteration. The symbols are used to determine bit reliability metrics for the block of memory cells. The bit reliability metrics are decoded. In response to the decoding failing, an additional iteration of the decoding operation is performed.

20 Claims, 8 Drawing Sheets

(56) References Cited

U.S. PATENT DOCUMENTS

| | | | |
|---|---|---|---|
| 2012/0236641 A1 | 9/2012 | Hu | |
| 2013/0117640 A1* | 5/2013 | Tai et al. | 714/780 |
| 2013/0318395 A1* | 11/2013 | Kalavade et al. | 714/15 |
| 2014/0040704 A1* | 2/2014 | Wu et al. | 714/773 |
| 2014/0281822 A1* | 9/2014 | Wu et al. | 714/773 |
| 2014/0281828 A1* | 9/2014 | Micheloni et al. | 714/773 |

OTHER PUBLICATIONS

Gunnam, K., "LDPC Decoding : VLSI Architectures and Implementations", Module 2: VLSI Architectures and Implementations, Flash Memory Summit 2012, Aug. 2012, 51 pp.

Motwani, R., et al., "Low Density Parity Check (LDPC) Codes and the Need for Stronger ECC", Intel Corporation, Aug. 2011, 18 pp.

Varnica, N., "LDPC Decoding: VLSI Architectures and Implementations", Module 1: LDPC Decoding, Flash Memory Summit 2012, Aug. 2012, 55 pp.

Wang, J. et al., "LDPC Decoding with Limited-Precision Soft Information in Flash Memories", Sep. 29, 2012, arXiv:1210.0149, 27 pp.

Wang, et al., "Soft Information for LDPC Decoding in Flash: Mutual-Information Optimized Quantization", In Proceedings of the 2011 IEEE Global Telecommunications Conference, Dec. 2011, 6 pp.

Yu, A., "Improving NAND Reliability with Low-Density Parity Check Codes (LDPC)", Flash Memory Summit 2011, Aug. 2011, 10 pp.

Zhao, K., et al., "LDPC-in-SSD: Making Advanced Error Correction Codes Work Effectively in Solid State Drives", In Proceedings of the 11th USENIX Conference on File and Storage Technologies, 2013, 14 pp.

* cited by examiner

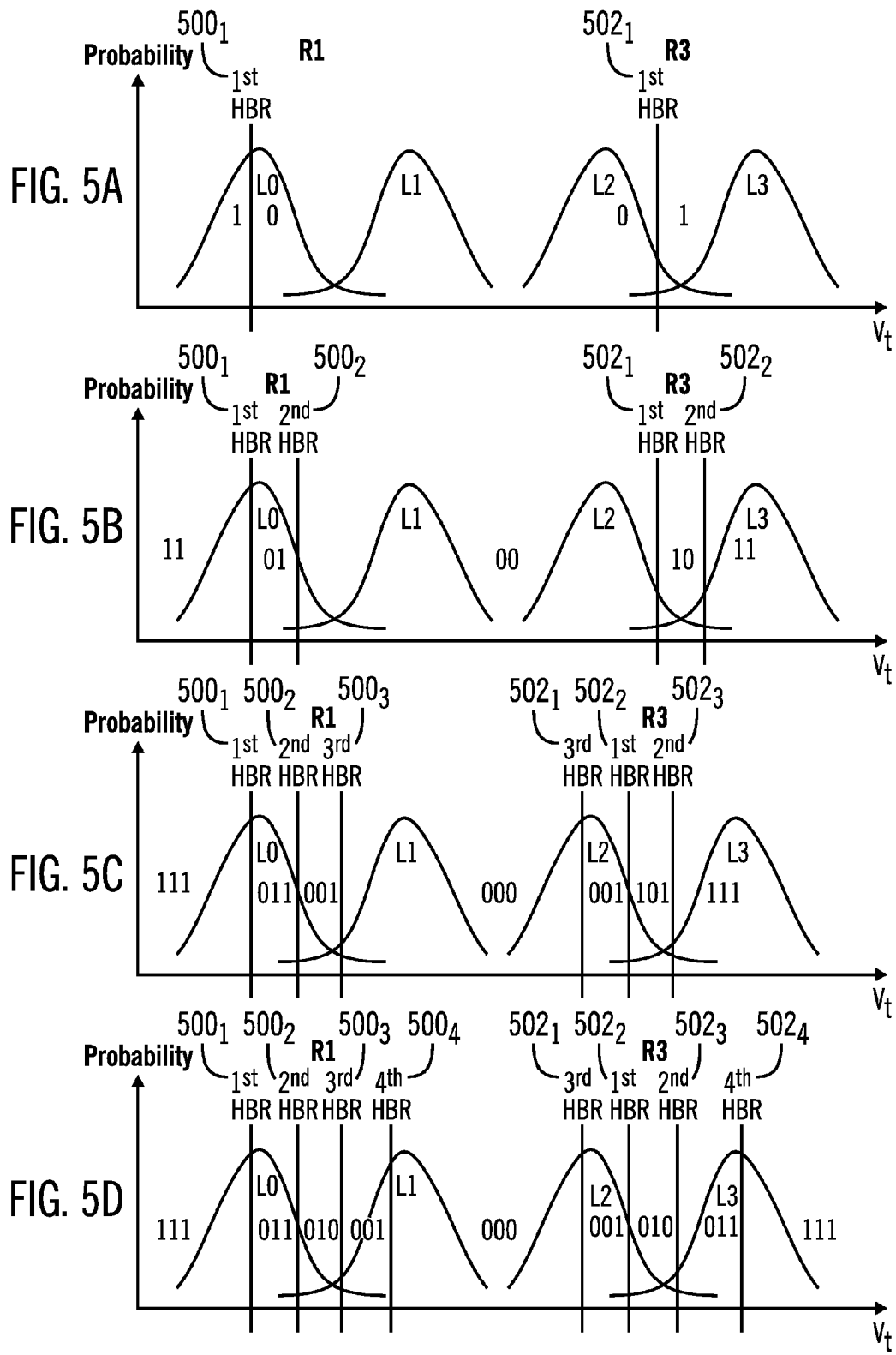

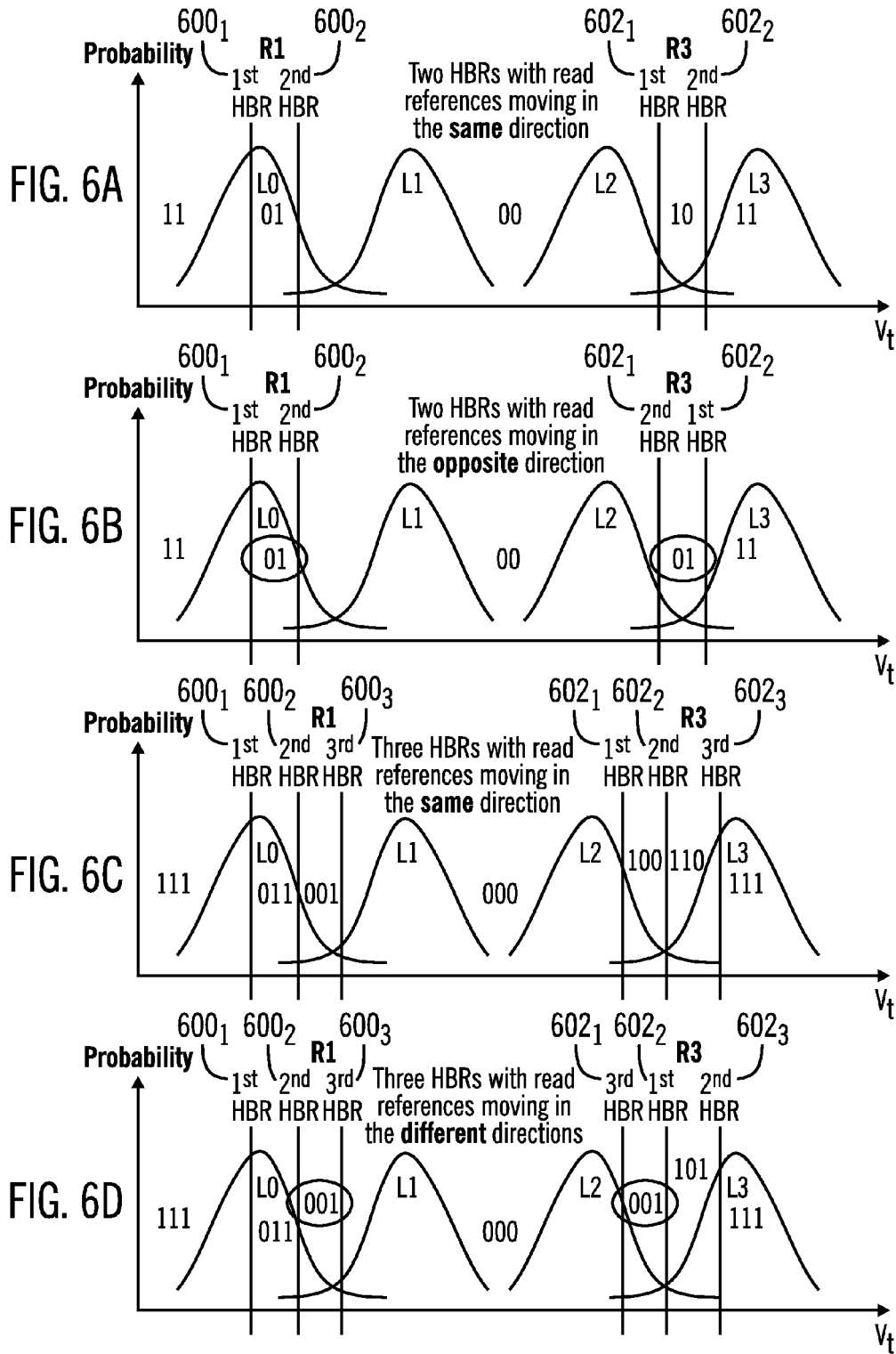

USING READ VALUES FROM PREVIOUS DECODING OPERATIONS TO CALCULATE SOFT BIT INFORMATION IN AN ERROR RECOVERY OPERATION

TECHNICAL FIELD

Embodiments described herein generally relate to error recovery or read retry operations with respect to non-volatile storage devices, such as flash storage devices, including multi-level cell (MLC) NAND flash memory that stores more than one bit of information per cell or a single-cell (SLC) NAND flash memory.

BACKGROUND

An error correction code (ECC) failure in a NAND flash memory triggers a sequence of reads, also referred to as hard bit reads (HBRs), until the read data is recovered. If an error occurs, multiple HBRs are performed to determine the soft bit information to use for decoding. Current techniques require that the HBR information from multiple iterations be buffered to determine the soft bit information from statistics on the multiple read retries. Low Density Parity Check (LDPC) error correction algorithms have been utilized for NAND flash memory, but may result in high read latency. LDPC error correction techniques require the use of soft bit information that is generated during different read iterations based on statistics of previous reads performed during the error recovery, which requires buffering of the hard bit read (HBR) information.

There is a need in the art for improved techniques for gathering soft bit information for error recovery operations in non-volatile storage devices.

BRIEF DESCRIPTION OF THE DRAWINGS

Embodiments are described by way of example, with reference to the accompanying drawings, which are not drawn to scale, in which like reference numerals refer to similar elements.

FIGS. 5a, 5b, 5c, 5d illustrate an example of how the soft symbol information is generated according to the operations of FIGS. 3a and 3b during four iterations of reads of the upper level bits using the read reference voltages.

FIGS. 6a, 6b, 6c, 6d illustrate an example of how the soft symbol information varies depending on the direction in which the read reference voltages change between iterations.

DESCRIPTION OF EMBODIMENTS

During read operations, a cells threshold voltage is compared to predefined read reference voltages until the upper and lower bound read reference voltages are identified to determine the stored value.

Described embodiments provide techniques for determine soft bit information for a decoder during error recovery operations by using the previously read values during iterations of the error recovery operation to form symbols that are provided to the decoder to decode. The symbol value increases in number of bits and uses different read value bits during different iterations. In this way, more detailed and robust soft bit symbol information is incrementally generated during each iteration by adding an extra or new bit of information from the read values.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

Figure 1:
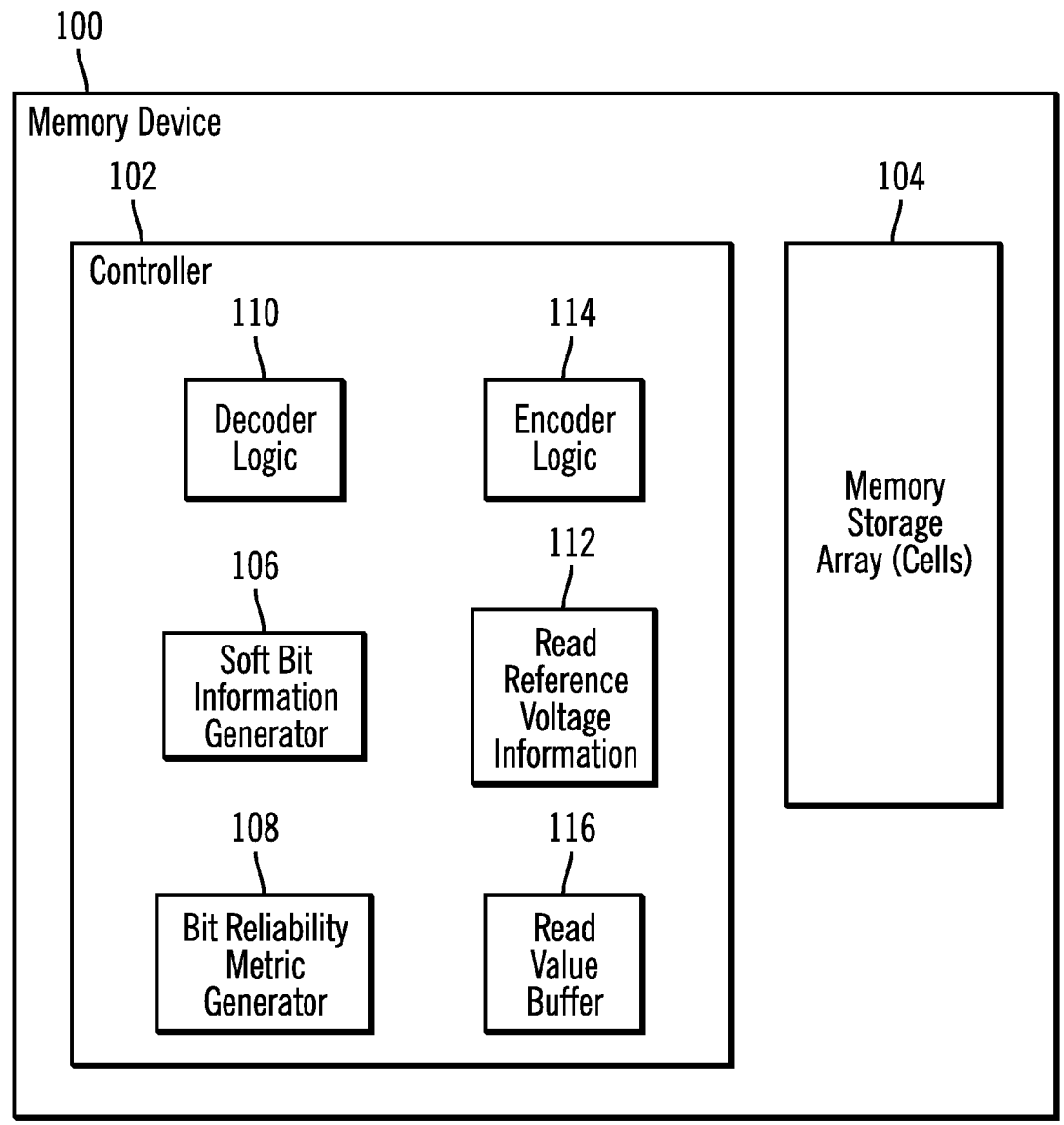
FIG. 1 illustrates an embodiment of a storage device.

FIG. 1 illustrates an embodiment of a storage device 100, such as a solid state storage device (SSD), including a non-volatile memory controller 102 to perform read, write and error recovery (also known as read retry) operations with respect to a memory storage array 104 of electrically erasable and non-volatile memory cells. The controller 102 includes a soft bit information generator 106 to generate soft bit information from observed read values to provide to a bit reliability metric generator 108 that generates bit reliability metrics that are supplied to a decoder 110 to decode the bit reliability metrics to determine read values from the read voltages from the memory cells 104 as part of a read retry or error recovery operation when the read value cannot be initially determined. The soft bit information generator 106 may utilize predefined read reference voltages maintained in read reference voltage information 112 to determine the read values, or hard bit reads (HBRs), that are buffered in a read value buffer 116, and used to generate soft bit information in the form of soft bit symbols that are then used by the bit reliability metric generator 108 to determine a bit reliability metric for each of the memory cells involved in the error recovery/read retry operation, such as a page of memory cells. The controller 102 further includes an encoder 114 to encode data to write to the memory cells 104 in a manner to maximize the probability of the data being accurately recovered.

In one embodiment, the storage device 100 may comprise a flash storage device, such as a multilevel cell (MLC) NAND flash memory that in each cell records two bit values, a lower bit value and an upper bit value. The storage device 100 may also include, but not limited to, NAND (flash) memory, ferroelectric random-access memory (FeTRAM), nanowire-based non-volatile memory, three-dimensional (3D) cross-point memory such as phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. The bit reliability metrics generated by the bit reliability metric generator 108 may comprise Log Likelihood Ratios (LLRs) determined by applying a LLR function, lookup table or mapping to the soft bit symbols from the soft bit information generator 106. The soft bit information generator 106 converts the read voltages to soft bit symbols based on read reference voltages in the reference voltage information 112 to symbols that the bit reliability metric generator 108 maps to LLR values, or other reliability metric values, that are transmitted to the decoder 108 to decode to produce the read data. In one embodiment, the decoder 108 may utilize Low Density Parity Check (LDPC) decoding algorithms known in the art to decode the bit reliability metrics, e.g., LLR values. The encoder 114 may also employ LDPC encoding operations to write the data to the memory cells 104, such as by introducing redundancy into the data to optimize chances of recovering the data. The decoder 108 and encoder 114 may use other error correction coding schemes known in the art, such as Reed-Solomon Codes, Bose, Chaudhuri, Hocquenghem (BCH) codes, and turbo codes.

Figure 2:
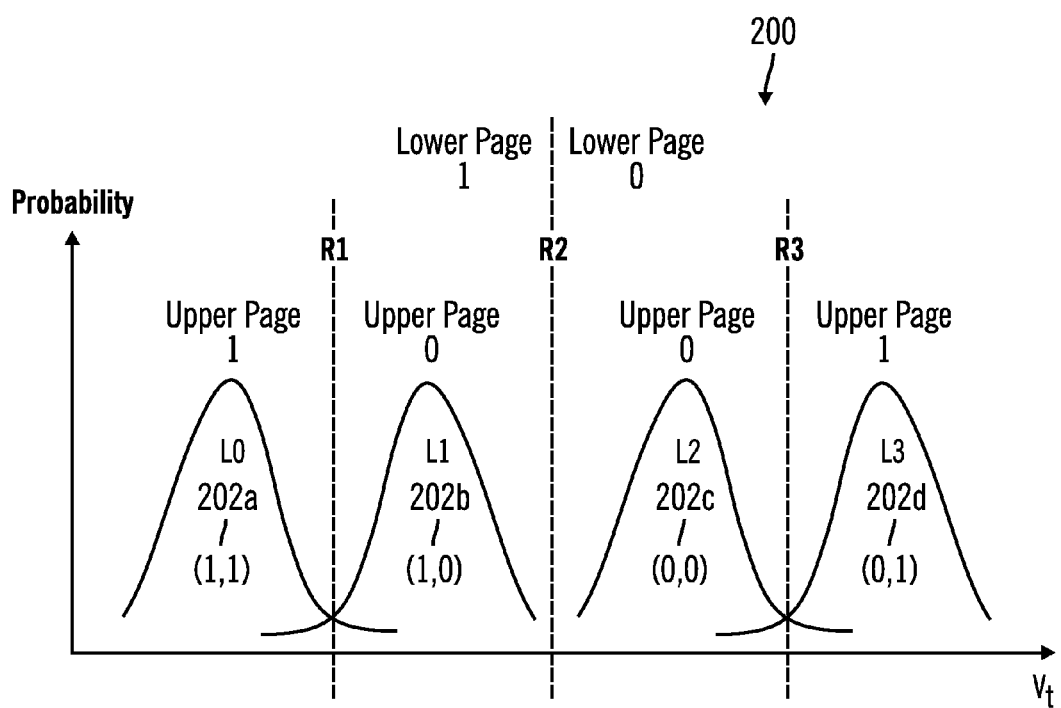
FIG. 2 illustrates a four level NAND distribution with upper and lower pages and the read reference voltages used for the upper and lower pages.

FIG. 2 shows an embodiment of a probability distribution of voltages for the storage device 100 implemented with a 4-level MLC NAND distribution 200 with upper and lower pages and four programming levels L0, L1, L2, and L3 to store four levels of charges per cell, an erased level L0 and programmed levels L1, L2, and L3, where these four states yield two logical bits of information, a lower page bit and an upper page bit. The lower page read samples in the center, between Level 1 (L1) and Level 2 (L2) probability distributions, denoted by R2. The upper page samples with two read voltage references, one between Level 0 and Level 1, and the other between Level 2 and Level 3, denoted by R1 and R3 respectively. The two bit values are shown in parenthesis 202*a*, 202*b*, 202*c*, 202*d* based on the read values by applying the read reference voltages R1, R2, R3. The first lower page bit value of the two in parenthesis 202*a*, 202*b*, 202*c*, 202*d* shows the read lower bit value and the second upper page bit value of the two in the parenthesis 202*a*, 202*b*, 202*c*, 202*d* shows the read upper page bit value.

Described embodiments provide techniques to generate soft bit information for use in determining the bit reliability metrics, such as LLRs, during different read retries for an error recovery operation that utilizes previously read values (HBRs) during the iterations of the error recovery operation.

Figure 3A:
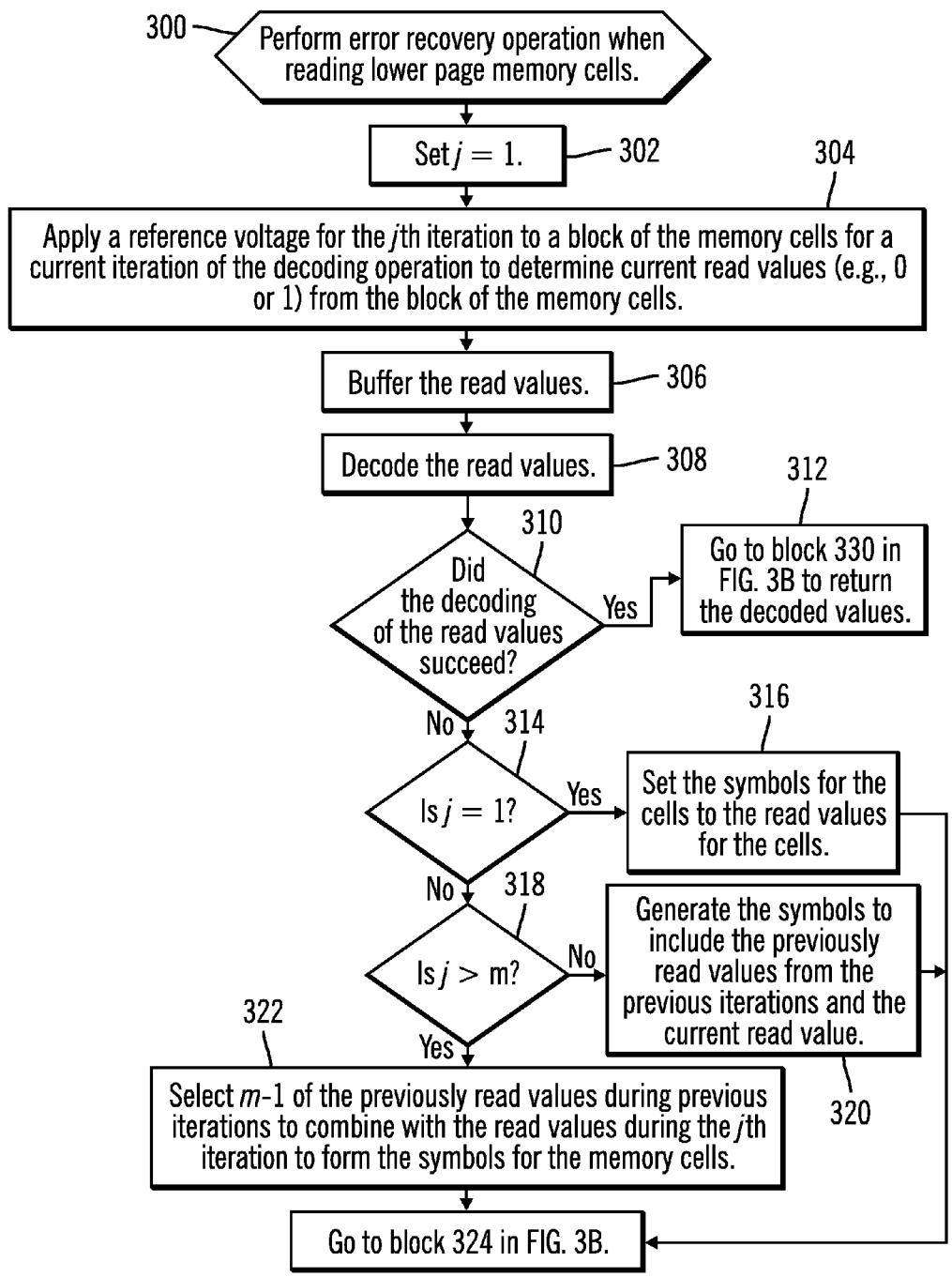
FIGS. 3a and 3b illustrate an embodiment of operations to perform error recovery for reading a block of memory cells.
Figure 3B:
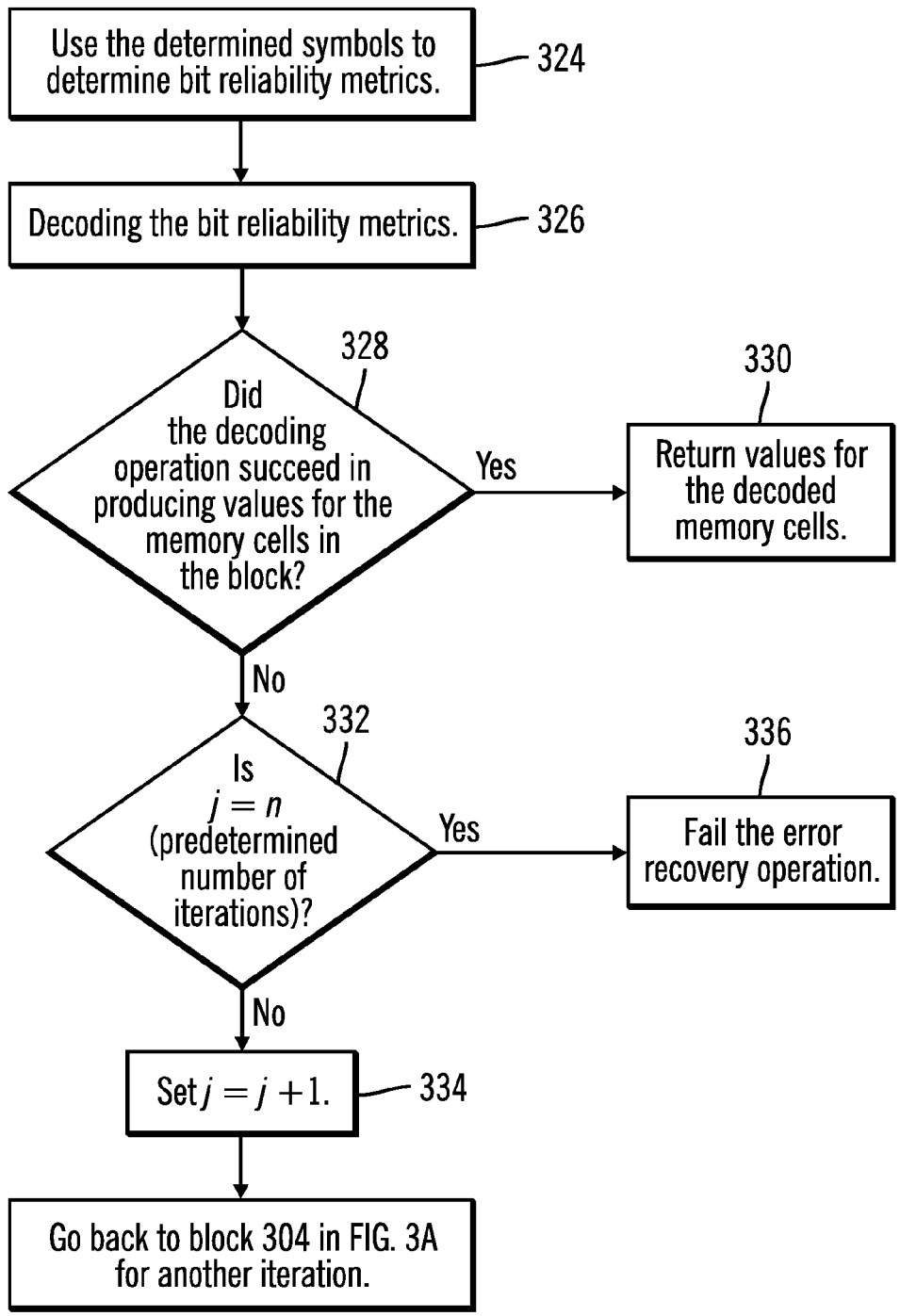

FIGS. 3*a* and 3*b* illustrate an embodiment of operations performed by the controller 102, and components therein, to perform error recovery operations for a read with respect to a block of memory cells 104, such as a page of memory cells. Iterations of the decoding operations are performed until correct read values for the memory cells 104 can be decoded or until a predetermined number of read retry iterations are performed. Upon initiating (at block 300) the error recover operation for a page of memory cells 104, such as upper or lower bits of the memory cells, the controller 102 sets (at block 302) the variable j, indicating a current iteration of the error recovery operation being performed, to one for the first iteration. The controller 102 applies at least one read reference voltage for the jth iteration (depending on whether reading the upper or lower bits) to the block of memory cells 104 to determine the current read values, i.e., 0 or 1, (at block 302) for the block of the memory cells 104. The read values are buffered (at block 306) in the read value buffer 116. In alternative embodiments, read values may not be buffered and instead the symbols are saved to use in subsequent iterations.

The read values are decoded (at block 308). If (at block 310) the decoding succeeded, then control proceeds to block 330 in FIG. 3*b* to return the decoded values. If (at block 310) the decoding failed then if (at block 316) the first iteration is being performed, i.e., j=1, then the soft bit information generator 106 sets (at block 316) the symbols for the cells to the read values for the cells, or the one bit read.

If (at block 316) the iteration being performed follows the first iteration, i.e., j is not one, and if (at block 318) the number of iterations does not exceed the maximum number (m) of read value bits to include in the symbol, i.e., j is not greater than m, then the soft bit information generator 106 generates (at block 320) the symbols to include the previously read values from the previous iterations and the current read value. In one embodiment, the symbols may include the bits in the order in which they were read during the iterations, where the symbol includes a bit for each performed iteration at this point. Further, in embodiments where the symbols are to have the same number of bits for each iteration, e.g., three, if the generated symbols at block 316 and 320 included less than three bits, then a third bit may be appended, such as to the beginning of the symbol to produce a three bit symbol.

If (at block 318) the number of iterations exceeds the maximum number (m) of read value bits to include in the symbol, i.e., j>m, then the soft bit information generator 106 selects (at block 322) m−1 of the previously read values during previous iterations, stored in the read value buffer 116, to combine with the current read values read during the jth iteration to form the symbols for the memory cells to have m symbols. In this way, the symbols are formed by combining the current read value with a subset of the previously read values read during the previously performed iterations of the decoding operation.

In one embodiment, the subset of the previously read values is selected to maximize mutual information provided by the previously read values when considered with the current value over all possible subsets of the previously read values and the current read value. The subset is selected so as maximize the extent to which the values in the subset reduces uncertainty about the currently read value. In other words, the subset of m−1 previously read values is selected to produce a result having the lowest bit errors and closest relative spacing of the read values.

From block 322, control proceeds to block 324 in FIG. 3*b* where the symbols determined for the read memory cells 104, one for each of the read memory cells 104, are used by the bit reliability metric generator 108 to determine bit reliability metrics for the symbols. In one embodiment, the bit reliability metric generator 108 may comprise an LLR calculator that maps the received symbols to LLR values. The decoder 110 decodes (at block 326) the bit reliability metrics to determine read values for the memory cells 104. If (at block 322) the decoding operation succeeded in producing read values, then the controller 102 returns (at block 330) the read values for the decoded memory cells 104. If (at block 328) the decoding operation failed to produce with a sufficient degree of reliability read values and if (at block 332) a predetermined number of the decoding operations have not been performed, then j is incremented (at block 334) for the next iteration and control proceeds back to block 304 in FIG. 3*a* to perform another read and decoding operation to generate a next set of symbol values to convert to bit reliability metrics for decoding. Otherwise, if (at block 332) the decoding operations have been performed a predetermined number of times, such as four times, then the error recovery operation is failed (at block 336).

Described embodiments generate soft bit information by incrementally generating symbols used to generate soft bit information after each of the hard bit reads (HBRs) from the different iterations to extract the soft-bit information at each iteration. In certain embodiments, the symbols may not be generated until the second or third iteration and then are generated at each following iteration. In certain embodiments, up to four iterations are performed for a recovery operation and in other embodiments more than four iterations may be the limit.

In embodiments where the symbols used for generating the bit reliability metrics have m bits, the number of bits in the symbols is increased by one during each iteration up to the first m iterations and for iterations following the mth, a subset of the previously read values are selected to minimize errors or maximize the usefulness of the information in the symbols.

Each soft symbol is mapped to an LLR (log-likelihood ratio) through a look-up table. Parameters that are used for the look-up table include which voltage reference had the fewest errors in hard decoding, whether there were duplicated values for voltage references, and the ordering of the read reference voltages.

In the embodiment of FIGS. 3a and 3b, the read values are buffered across iterations to use when forming the symbols. In an alternative embodiment, the previous read values, e.g., HBRs, are not buffered, but the symbol value is saved. The save soft information symbol value may then be merged with the new read value to form a new soft symbol information, which may have the same number of bits.

Figure 4A:
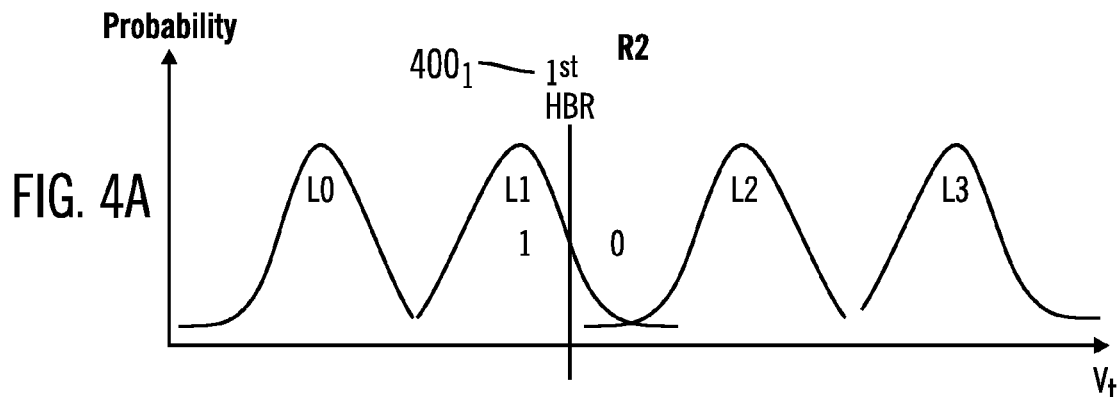
FIGS. 4a, 4b, 4c, 4d illustrate an example of how the soft symbol information is generated according to the operations of FIGS. 3a and 3b during four iterations of reads of the lower level bits using the read reference voltages.

FIGS. 4a, 4b, 4c, and 4d illustrate the decoding operations of FIGS. 3a and 3b for up four iterations for reading the lower level bit of the memory cells. FIG. 4a illustrates a first iteration where the read values are read by applying a read reference voltage $500_1$—and the symbol is the resulting read value.

Figure 4B:
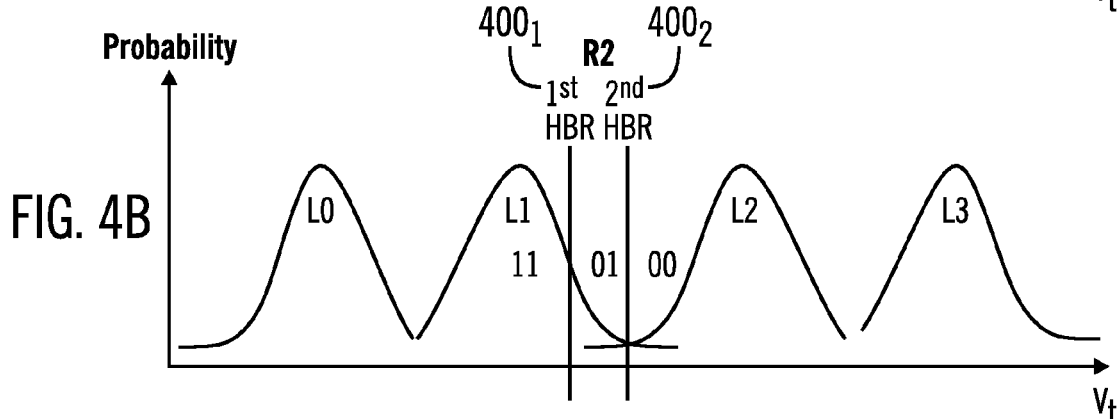

FIG. 4b illustrates a symbol value produced during a second iteration where the symbol has two bit values and a second current read value is determined by applying the second read reference voltage $400_2$, which increases with respect to the previously used read reference voltage $400_1$, where the bin in which the symbol is included is based on the first and second read values. FIG. 4b illustrates a soft bin in which the symbol is included based on the two read values.

Figure 4C:
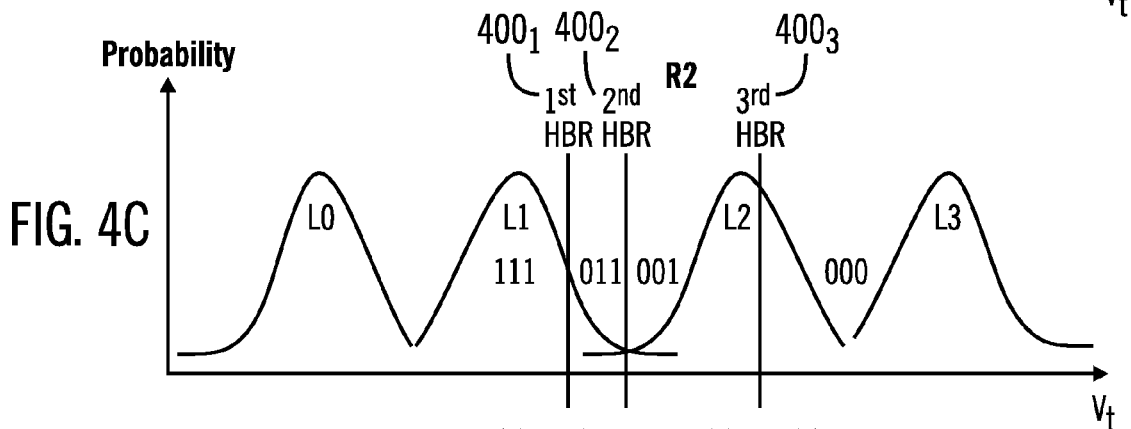

FIG. 4c illustrates a symbol value produced as a result of a third iteration where the symbol has three bit values and a current third read value is determined by applying the third read read reference voltage $400_3$, which increases with respect to the previously used read reference voltages $400_1$ and $400_2$. The bin in which the symbol is included is based on the first, second and third read values.

Figure 4D:
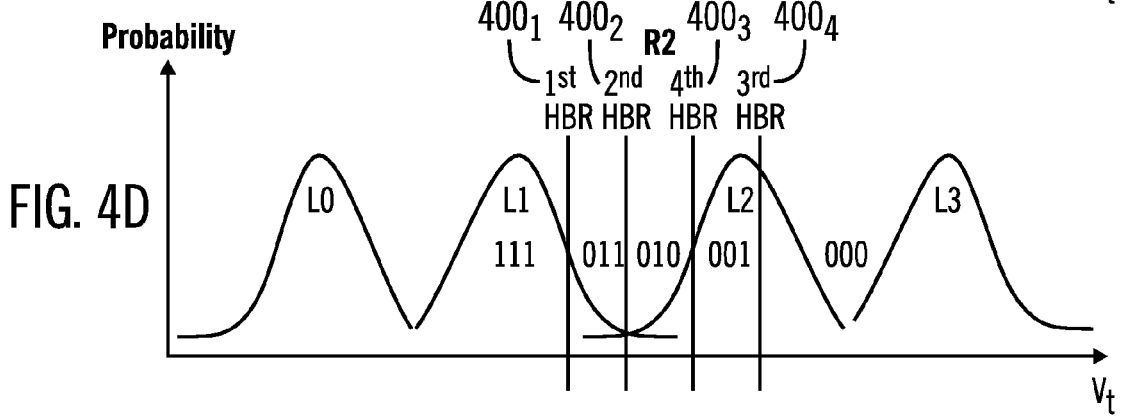

FIG. 4d illustrates a fourth iteration having the three previously considered read reference voltages $400_1$, $400_2$, and $400_3$, and a new fourth read reference voltage $400_4$. FIG. 4d shows the embodiment where the symbol comprises three bits, and the symbol value is determined by the previous read values (HBRs) if previous values are buffered or the previous value of the symbol if the symbol is saved and read HBR data is not buffered. In the coding of FIG. 4d, the new symbol remains the same three bit value if the previous value of the symbol was not in a bin between the second and third read reference values $400_2$ and $400_3$, i.e., the previous symbol value was 111, 011 or 000. However, if the previous symbol value was in a bin between the read reference values split by the new fourth read reference value $400_4$, such as having the previous symbol value 001, then the new symbol value is determined by the new read value. If the previous symbol value was 001 (i.e., in the bins split by the new read reference) and the new read value is a "1", then the coding for the symbol is 010, else if the new read value is a "0", then the coding is 011. Thus, the new symbol value only changes if the previous symbol was 001, in the bin divided by the new read reference value, which new coding is determined by the read.

FIGS. 5a, 5b, 5c, and 5d illustrate the decoding operations of FIGS. 3a and 3b for four iterations when reading an upper bit value requiring two reference voltages. FIG. 5a illustrates a first iteration with a first $500_1$ and second $502_1$ read reference voltages and the symbol comprises the resulting read upper bit value.

FIG. 5b illustrates a symbol value produced during a second iteration where the symbol has two bit values and the current second read value is determined by applying the first and second read voltage $500_2$, $502_2$ for the second iteration, which increase with respect to the previously used first read reference voltages $500_1$ and $502_1$, where the bin in which the symbol is included is based on the first and second read values. FIG. 5b illustrates the soft bins in which the symbol is included based on the two read values.

FIG. 5c illustrates a symbol value produced during a third iteration where the symbol value has three bit values and the current third read value is determined by applying the first, and second read voltage $500_3$, $502_3$ for the third iteration, which decrease with respect to the previously used read reference voltages. The bin in which the symbol is included is based on the first, second and third read values. FIG. 5c illustrates the soft bins in which the symbol is included based on the third read values.

FIG. 5d illustrates a fourth iteration having the two previously considered pair of read reference voltages $500_1$, $502_1$, $500_2$, $502_2$, and $500_3$, $502_3$, and a new upper and lower fourth read reference voltage $500_4$, $502_4$, which are greater than the previous upper and lower read reference voltages. FIG. 5d shows the embodiment where the symbol comprises three bits, and the symbol value is determined by the previous read values (HBRs) if previous values are buffered or the previous value of the symbol if the symbol is saved and read HBR data is not buffered. In the coding of FIG. 5d, the new symbol remains the same as the previous symbol value if the previous value of the symbol was in the bins having the values 111, 011, 001. However, if the previous symbol value was 001, 000, 101 or 101, then the new symbol value is determined by the new read value. According to the shown coding, if the previous symbol value was 001, then the new coding is 010 regardless of the read value; if the previous coding was 000, and the new read value is a "1", then the coding for the symbol is 001, else if the new read value is a "0", then the coding is 000; if the previous symbol was 101, then the new coding for the symbol is 010 regardless of the current read value; and if the previous coding was 111, and the new read value is a "1", then the coding for the symbol is 011, else if the new read value is a "0", then the coding is 111

The codings used for the symbols as shown in FIGS. 4a, 4b, 4c, 4d and 5a, 5b, 5c, 5d may differ in different embodiments, where the codings defined for the bins between the read reference voltages may differ than as shown, and the symbol values shown may be set to different values in different embodiments.

Although four bits are shown to show the symbol values for all four reads, if the symbol is only comprised of three bits, then one bit of the first three previous reads not included in the symbol would not be included in the final symbol value In the example of FIGS. 4a, 4b, 4c, 4d for reading lower page bits, the read reference voltages for later iterations increase as shown.

In the read reference voltages of FIGS. 5a, 5b, 5c, 5d for reading upper page bits, the different first and second reference voltages in different iterations move in different directions. In FIG. 5b, the second iteration read reference voltages $500_2$, $502_2$ are greater than the first iteration read reference voltages $500_1$, $502_1$. In FIG. 5c, the third iteration first read reference voltage $500_3$ is greater than the first read reference voltages $500_1$, $500_2$ from the first two iterations but the third iteration second read reference voltage $502_3$ is less than the second read reference voltages $502_1$, $502_2$ from the first two iterations. In FIG. 5d, the fourth iteration first read reference voltage $500_4$ is greater than the first read reference voltages $500_1$, $500_2$, $500_3$ from the first three iterations but the fourth iteration second read reference voltage $502_3$ is greater than the second read reference voltages $502_1$, $502_2$, $502_3$ from the first three iterations. In FIGS. 5a, 5b, 5c, 5d, in the second and fourth iterations, the first and second read reference voltages move in the same direction, both increase with respect to the previous read reference voltages. However, in the third iteration, the first and second read reference voltages $500_3$ and $502_3$ move in opposite directions, such that the second read reference voltage $502_3$ in the third iteration is less than the second read reference voltages form the previous iterations. The read reference voltage information 112 may include different settings for having the reference voltages in different iterations move in the same or different directions.

In alternative embodiments, the first and second read reference voltages during different iterations, as maintained in the read reference voltage information 120, may move in different directions than shown in FIGS. 5a, 5b, 5c, 5d.

For lower page reads, even if the read reference voltages move in different directions, for symbol bit value, or bin, there will be a unique soft symbol. However, it is possible for upper page reads to have duplicated symbol bit values for multiple bits (bins), as there are two read references that sample at different parts of the distribution. The upper page read references are sorted according to their voltage values for the first iteration (R1), while the read reference voltages for the third iteration (R3) values can vary and be in any order.

FIGS. 6a, 6b, 6c, 6d illustrate how the symbol values for a read voltage, i.e., hard bit read (HBR), can differ depending on how the first and second read reference voltages in later iterations move with respect to the first and second read reference voltages to read in the previous iterations. For instance, FIGS. 6a and 6b show how the symbol values vary when the second read reference voltage $602_2$ move in the same and opposite directions. Similarly, FIGS. 6c and 6d show how the symbol values vary when the third read reference voltage $602_3$ varies, moves in the same and opposite directions.

FIGS. 6a, 6b, 6c, 6d show the distinct regions when the read reference voltages move in opposite directions that cannot be uniquely mapped by the read voltages as one soft symbol can indicate two different bins, FIG. 6b shows two same symbol values "01" for different read voltages and FIG. 6d shows two same symbol values "001" for different read voltages. For instance, if the second read corresponds to the optimal read reference, then 01 is the low confidence 1 for both the regions corresponding to a 01 read. Hence, there is no ambiguity in LLR assignments even if the regions are not uniquely mapped by the read voltage since those regions correspond to the same confidence of the same bit. A similar observation can be made for all possible shifts of the read reference voltages. This principle may be extended for more than two iterations of read voltages according to the principle of induction. For instance, FIGS. 6c and 6d provide an example for three iterations of read voltages Information theoretic estimates show that there is a very minor degradation of the bit reliability metric resulting from a symbol with three reads.

In the described embodiments, soft bit information was provided to the bit reliability metric generator 108 after the first read. In further embodiments, soft bit information may not be provided until a second or third read iteration to provide more robust symbol information to the bit reliability metric generator 108. The described embodiments provide techniques to generate soft bit information in the form of symbols generated by buffering read values during iterations of read retries during an error recovery operation. This allows symbols to increase in bit length during each iteration to provide more detailed information to determine the bit reliability metrics, e.g., LLR values, during a subsequent iteration when the read values could not be recovered during a previous iteration.

Further in certain implementations, only four iterations of reading voltages, HBRs, are performed during error recovery, to calculate the soft bit information, which is an improvement over prior art techniques that require a greater number of HBR iterations, such as on the order of ten to produce one instance of soft bit information. With described embodiments, the soft bit symbol information is calculated from the current and previous reads.

Further, with described embodiments, multiple LDPC decoding operations may be performed as part of the error recovery operation during different iterations to provide improved raw bit error (RBER) correction capability over non-LDPC error recovery techniques.

Figure 7:
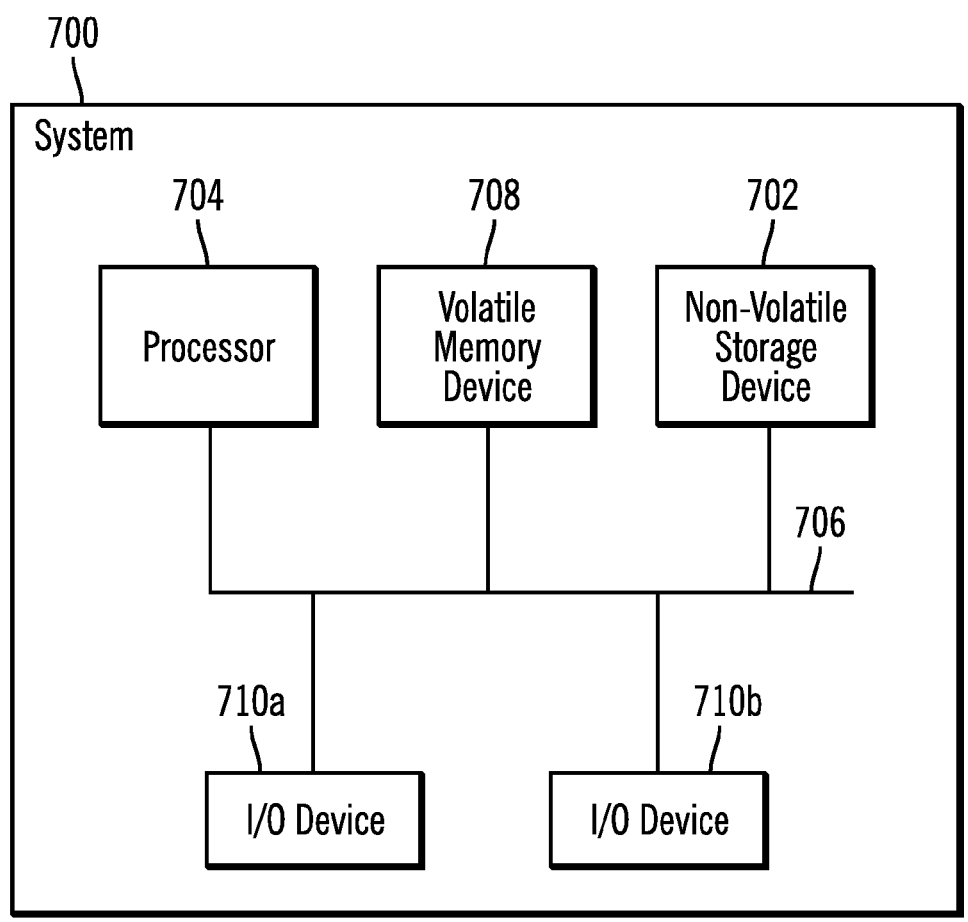
FIG. 7 illustrates a system in which the storage device of claim 1 may be deployed.

FIG. 7 illustrates an embodiment of a system 700 in which a non-volatile storage device 702, such as storage device 100 of FIG. 1, may be deployed. The system includes a processor 704 that communicates over a bus 706 with a volatile memory device 708 in which programs, operands and parameters being executed are cached and the non-volatile storage device 702, in which data and programs may be stored. The processor 700 may also communicate with Input/Output (I/O) devices 710a, 710b, which may comprise input devices, display devices, graphics cards, ports, network interfaces, etc. The non-volatile storage device 702 may be mounted to the system enclosure 700, such as in a storage drive bay, or connected to the system 700 through a port interface or over the network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the memory controller 102 and the logic components 106, 108, 110, and 114, may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration without departing from the scope of the present invention, and that the article of manufacture may comprise suitable information bearing medium known in the art.

EXAMPLES

The following examples pertain to further embodiments.

Example 1 is an apparatus for performing error recovery for writing to a block of cells in a storage device comprising a controller coupled to a storage device that performs an error recovery operation with respect to a read of a block of memory cells in the storage device by performing operations comprising: performing a current iteration of a decoding operation, comprising: applying at least one reference voltage for the current iteration to a block of the memory cells in the storage device to determine current read values in response to applying the reference voltage; generating a symbol for each of the read memory cells by combining the determined current read value with at least one value saved during the previous iteration; using the symbols to determine bit reliability metrics for the block of memory cells; decoding the bit reliability metrics; and in response to the decoding failing, performing an additional iteration of the decoding operation.

In Example 2, the subject matter of Example 1 can optionally include that during each iteration, decoding with the current read values, wherein the operations of generating the symbols, using the symbols to determine bit reliability metrics, decoding the bit reliability metrics and performing the additional iteration are only performed in response to the decoding using the current read values failing.

In Example 3, the subject matter of Examples 1 and 2 can optionally include that the symbols determined during the different iterations of the decoding operations have a same number of bits.

In Example 4, the subject matter of Examples 1-3 can optionally include that the at least one value saved during the previous iteration and combined with the current read value comprises previous read values for the memory cells read during the previous iterations, wherein the combining the determined current read value with the at least one value saved comprises combining the current read value with a subset of the previous read values read during the previously performed iterations of the decoding operation.

In Example 5, the subject matter of Examples 1-4 can optionally include that the subset of the previous read values is selected to maximize mutual information provided by the previous read values over possible subsets of the previous read values and the current read value.

In Example 6, the subject matter of Examples 1-5 can optionally include that the combining the determined current read value with at least one previous read value for the memory cells during any previously performed iteration of the decoding operations comprises combining the current read value with all of the previous read values read during the previously performed iterations of the decoding operation.

In Example 7, the subject matter of Examples 1-6 can optionally include that n iterations of the decoding operations are performed, wherein during a first m iterations of the decoding operations, where m is less than n, all the previous read values are combined with the current read value to form the symbol, and wherein during the jth iteration of the decoding operation following the mth iteration, (m−1) of the previous read values during the previous iterations are combined with the current read value.

In Example 8, the subject matter of Examples 1-7 can optionally include buffering the read values used during the iterations; and using a selection criteria to select (m−1) of the previous read values to combine with the current read value during the jth iteration of the decoding operation following the mth iteration.

In Example 9, the subject matter of Examples 1-8 can optionally include that the at least one value saved from the previous iterations comprises a previous symbol generated during the previous iteration, and wherein the combining the determined current read value with the previous symbol comprises using the previous symbol and the current read value to determine the generated symbol value for the current iteration.

In Example 10, the subject matter of Examples 1-9 can optionally include that the storage device comprises a multi level cell NAND storage.

In Example 11, the subject matter of Examples 1-10 can optionally include that the bit reliability metrics comprise Log Likelihood Ratio (LLR) values, and wherein the decoding uses a low density parity check (LDPC) code algorithm to decode the LLR values.

Example 12 is a method for performing error recovery for writing to a block of cells in a storage device comprising performing an error recovery operation with respect to a read of a block of memory cells in a storage; and performing a current iteration of a decoding operation as part of the error recovery operation by: applying at least one reference voltage for the current iteration to a block of the memory cells in the storage device to determine current read values in response to applying the reference voltage; generating a symbol for each of the read memory cells by combining the determined current read value with at least one value saved during the previous iteration; using the symbols to determine bit reliability metrics for the block of memory cells; decoding the bit reliability metrics; and in response to the decoding failing, performing an additional iteration of the decoding operation.

In Example 13, the subject matter of Example 12 can optionally include that during each iteration, decoding with the current read values, wherein the operations of generating the symbols, using the symbols to determine bit reliability metrics, decoding the bit reliability metrics and performing the additional iteration are only performed in response to the decoding using the current read values failing.

In Example 14, the subject matter of Examples 12-13 can optionally include that the symbols determined during the different iterations of the decoding operations have a same number of bits.

In Example 15, the subject matter of Examples 12-14 can optionally include that the at least one value saved during the previous iteration and combined with the current read value comprises previous read values for the memory cells read during the previous iterations, wherein the combining the determined current read value with the at least one value saved comprises combining the current read value with a subset of the previous read values read during the previously performed iterations of the decoding operation.

In Example 16, the subject matter of Examples 12-15 can optionally include that the subset of the previous read values is selected to maximize mutual information provided by the previous read values over possible subsets of the previous read values and the current read value.

In Example 17, the subject matter of Examples 12-16 can optionally include that the combining the determined current read value with at least one previous read value for the memory cells during any previously performed iteration of the decoding operations comprises combining the current read value with all of the previous read values read during the previously performed iterations of the decoding operation.

In Example 18, the subject matter of Examples 12-17 can optionally include that n iterations of the decoding operations are performed, wherein during a first m iterations of the decoding operations, where m is less than n, all the previous read values are combined with the current read value to form the symbol, and wherein during the jth iteration of the decoding operation following the mth iteration, (m−1) of the previous read values during the previous iterations are combined with the current read value.

In Example 19, the subject matter of Examples 12-18 can optionally include that the at least one value saved from the previous iterations comprises a previous symbol generated during the previous iteration, and wherein the combining the determined current read value with the previous symbol comprises using the previous symbol and the current read value to determine the generated symbol value for the current iteration.

In Example 20, the subject matter of Examples 12-19 can optionally include that the bit reliability metrics comprise Log Likelihood Ratio (LLR) values, and wherein the decoding uses a low density parity check (LDPC) code algorithm to decode the LLR values.

Example 21 is a system for performing error recovery for writing to a block of cells in a storage device comprising: a processor; a memory coupled to the processor; a storage device, wherein data is communicated among the processor, the memory, and the storage device, comprising: memory cells; controller coupled to a storage device that performs an error recovery operation with respect to a read of a block of memory cells in the storage device by performing operations comprising: performing a current iteration of a decoding operation, comprising: applying at least one reference voltage for the current iteration to a block of the memory cells in the storage device to determine current read values in response to applying the reference voltage; generating a symbol for each of the read memory cells by combining the determined current read value with at least one value saved during the previous iteration; using the symbols to determine bit reliability metrics for the block of memory cells; decoding the bit reliability metrics; and in response to the decoding failing, performing an additional iteration of the decoding operation.

In Example 22, the subject matter of Example 21 can optionally include that the combining the determined current read value with at least one previous read value for the memory cells during any previously performed iteration of the decoding operations comprises combining the current read value with all of the previous read values read during the previously performed iterations of the decoding operation.

In Example 23, the subject matter of Examples 21-22 can optionally include that the at least one value saved from the previous iterations comprises a previous symbol generated during the previous iteration, and wherein the combining the determined current read value with the previous symbol comprises using the previous symbol and the current read value to determine the generated symbol value for the current iteration.

In Example 24, the subject matter of Examples 21-23 can optionally include that the storage device comprises a multi level cell NAND storage.

In Example 25, the subject matter of Examples 21-24 can optionally include that the bit reliability metrics comprise Log Likelihood Ratio (LLR) values, and wherein the decoding uses a low density parity check (LDPC) code algorithm to decode the LLR values.

Example 26 is an apparatus for performing error recovery for writing to a block of cells in a storage device comprising: means for performing an error recovery operation with respect to a read of a block of memory cells in a storage device; and means for performing a current iteration of a decoding operation as part of the error recovery operation comprising: means for applying at least one reference voltage for the current iteration to a block of the memory cells in the storage device to determine current read values in response to applying the reference voltage; means for generating a symbol for each of the read memory cells by combining the determined current read value with at least one value saved during the previous iteration; means for using the symbols to determine bit reliability metrics for the block of memory cells; means for decoding the bit reliability metrics; and means for performing an additional iteration of the decoding operation in response to the decoding failing.

In Example 27, the subject matter of Example 26 can optionally include that the at least one value saved during the previous iteration and combined with the current read value comprises previous read values for the memory cells read during the previous iterations, wherein the means for combining the determined current read value with the at least one value saved combines the current read value with a subset of the previous read values read during the previously performed iterations of the decoding operation.

In Example 28, the subject matter of Examples 26-27 can optionally include that the n iterations of the decoding operations are performed, wherein during a first m iterations of the decoding operations, where m is less than n, all the previous read values are combined with the current read value to form the symbol, and wherein during the jth iteration of the decoding operation following the mth iteration, (m−1) of the previous read values during the previous iterations are combined with the current read value.

In Example 29, the subject matter of Examples 26-28 can optionally include that the at least one value saved from the previous iterations comprises a previous symbol generated during the previous iteration, and wherein the combining the determined current read value with the previous symbol comprises using the previous symbol and the current read value to determine the generated symbol value for the current iteration.

In Example 30, the subject matter of Examples 26-29 can optionally include that the bit reliability metrics comprise Log Likelihood Ratio (LLR) values, and wherein the decoding uses a low density parity check (LDPC) code algorithm to decode the LLR values.

Example 31 is a method for performing error recovery for writing to a block of cells in a storage device comprising: performing an error recovery operation with respect to a read of a block of memory cells in a storage; and performing a current iteration of a decoding operation as part of the error recovery operation by: applying at least one reference voltage for the current iteration to a block of the memory cells in the storage device to determine current read values in response to applying the reference voltage; generating a symbol for each of the read memory cells by combining the determined current read value with at least one value saved during the previous iteration; using the symbols to determine bit reliability metrics for the block of memory cells; decoding the bit reliability metrics; and in response to the decoding failing, performing an additional iteration of the decoding operation.

In Example 32, the subject matter of Example 31 can optionally include that during each iteration, decoding with the current read values, wherein the operations of generating the symbols, using the symbols to determine bit reliability metrics, decoding the bit reliability metrics and performing the additional iteration are only performed in response to the decoding using the current read values failing; and/or wherein the symbols determined during the different iterations of the decoding operations have a same number of bits; and/or wherein the at least one value saved during the previous iteration and combined with the current read value comprises previous read values for the memory cells read during the previous iterations, wherein the combining the determined current read value with the at least one value saved comprises combining the current read value with a subset of the previous read values read during the previously performed iterations of the decoding operation; and/or wherein the subset of the previous read values is selected to maximize mutual information provided by the previous read values over possible subsets of the previous read values and the current read value; and/or wherein the combining the determined current read value with at least one previous read value for the memory cells during any previously performed iteration of the decoding operations comprises combining the current read value with all of the previous read values read during the previously performed iterations of the decoding operation; and/or wherein n iterations of the decoding operations are performed, wherein during a first m iterations of the decoding operations, where m is less than n, all the previous read values are combined with the current read value to form the symbol, and wherein during the jth iteration of the decoding operation following the mth iteration, (m−1) of the previous read values during the previous iterations are combined with the current read value; and/or wherein the at least one value saved from the previous iterations comprises a previous symbol generated during the previous iteration, and wherein the combining the determined current read value with the previous symbol comprises using the previous symbol and the current read value to determine the generated symbol value for the current iteration; and/or wherein the bit reliability metrics comprise Log Likelihood Ratio (LLR) values, and wherein the decoding uses a low density parity check (LDPC) code algorithm to decode the LLR values.

Example 33 is a system for performing error recovery for writing to a block of cells in a storage device comprising:

Example 34 comprises machine-readable storage including machine-readable instructions, when executed, to implement a method or realize an apparatus or system as described in any of the Examples 1-33.

What is claimed:

1. An apparatus comprising:
a controller coupled to a storage device to perform an error recovery operation with respect to a read of a block of memory cells in the storage device, the controller to:
perform a current iteration of a decoding operation, comprising:
apply at least one reference voltage for the current iteration to the block of the memory cells in the storage device to determine current read values in response to apply the reference voltage;
generate a symbol for each of the memory cells of the block by combining a determined current read value of the determined current read values with a subset of previous read values read and saved during previous iterations of the decoding operation, wherein the subset of the previous read values is selected to maximize mutual information provided by the previous read values over possible subsets of the previous read values and the current read value;
use the symbols to determine bit reliability metrics for the block of memory cells;
decode the bit reliability metrics; and
in response to the decode failing, to perform an additional iteration of the decode operation.

2. The apparatus of claim 1, wherein the operations further comprise:
during each iteration, to decode with the current read values, wherein the operations to generate the symbols, use the symbols to determine bit reliability metrics, decode the bit reliability metrics and performing the additional iteration are only performed in response to the decode using the current read values failing.

3. The apparatus of claim 1, wherein the symbols determined during the previous iterations of the decoding operations have a same number of bits.

4. The apparatus of claim 1, wherein to combine the determined current read value with at least one previous read value for the memory cells during any previously performed iteration of the decode operations comprises to combine the current read value with all of the previous read values read during the previously performed iterations of the decode operation.

5. The apparatus of claim 1, wherein n iterations of the decode operations are performed, wherein during a first m iterations of the decode operations, where m is less than n, all the previous read values are combined with the current read value to form the symbol, and wherein during a jth iteration of the decoding operation following an mth iteration, (m−1) of the previous read values during the previous iterations are combined with the current read value.

6. The apparatus of claim 5, wherein the operations further comprise to:
    buffer the read values used during the iterations; and
    use a selection criteria to select (m−1) of the previous read values to combine with the current read value during the jth iteration of the decode operation following the mth iteration.

7. The apparatus of claim 1, wherein at least one previous read value saved from the previous iterations comprises a previous symbol generated during the previous iterations, and wherein the combine the determined current read value with the previous symbol comprises using the previous symbol and the current read value to determine the generated symbol for the current iteration.

8. The apparatus of claim 1, wherein the storage device comprises a multi level cell NAND storage.

9. The apparatus of claim 1, wherein the bit reliability metrics comprise Log Likelihood Ratio (LLR) values, and wherein the decoding uses a low density parity check (LDPC) code algorithm to decode the LLR values.

10. A method, comprising:
    performing an error recovery operation with respect to a read of a block of read memory cells in a storage device; and
    performing a current iteration of a decoding operation as part of the error recovery operation by:
        applying at least one reference voltage for the current iteration to the block of the memory cells in the storage device to determine current read values in response to applying the reference voltage;
        generating a symbol for each of the memory cells of the block by combining a determined current read value of the determined current read values with a subset of previous read values read and saved during previous iterations of the decoding operation, wherein the subset of the previous read values is selected to maximize mutual information provided by the previous read values over possible subsets of the previous read values and the current read value;
        using the symbols to determine bit reliability metrics for the block of memory cells;
        decoding the bit reliability metrics; and
        in response to the decoding failing, performing an additional iteration of the decoding operation.

11. The method of claim 10, further comprising:
    during each iteration, decoding with the current read values, wherein the generating the symbols, using the symbols to determine bit reliability metrics, decoding the bit reliability metrics and performing the additional iteration are only performed in response to the decoding using the current read values failing.

12. The method of claim 10, wherein the symbols determined during the previous iterations of the decoding operations have a same number of bits.

13. The method of claim 10, wherein the combining the determined current read value with at least one previous read value for the memory cells during any previously performed iteration of the decoding operations comprises combining the current read value with all of the previous read values read during the previously performed iterations of the decoding operation.

14. The method of claim 10, wherein n iterations of the decoding operations are performed, wherein during a first m iterations of the decoding operations, where m is less than n, all the previous read values are combined with the current read value to form the symbol, and wherein during a jth iteration of the decoding operation following an mth iteration, (m−1) of the previous read values during the previous iterations are combined with the current read value.

15. The method of claim 10, wherein at least one previous read value saved from the previous iterations comprises a previous symbol generated during the previous iterations, and wherein the combining the determined current read value with the previous symbol comprises using the previous symbol and the current read value to determine the generated symbol for the current iteration.

16. The method of claim 10, wherein the bit reliability metrics comprise Log Likelihood Ratio (LLR) values, and wherein the decoding uses a low density parity check (LDPC) code algorithm to decode the LLR values.

17. A system comprising:
    a processor;
    a memory coupled to the processor;
    a storage device, wherein data is communicated among the processor, the memory, and the storage device, comprising:
    memory cells;
    a controller coupled to a storage device to perform an error recovery operation with respect to a read of a block of the memory cells in the storage device to perform operations comprising:
        perform a current iteration of a decoding operation, comprising:
        apply at least one reference voltage for the current iteration to a block of the memory cells in the storage device to determine current read values in response to applying the reference voltage;
        generate a symbol for each of the memory cells of the block by combining a determined current read value of the determined current values with a subset of previous read values read and saved during previous iterations of the decoding operation, wherein the subset of the previous read values is selected to maximize mutual information provided by the previous read values over possible subsets of the previous read values and the current read value;
        use the symbols to determine bit reliability metrics for the block of memory cells;
        decode the bit reliability metrics; and
        in response to the decode failing, perform an additional iteration of the decode operation.

18. The system of claim 17, wherein at least one previous read value saved from the previous iterations comprises a previous symbol generated during the previous iterations, and wherein the combining the determined current read value with the previous symbol comprises using the previous symbol and the current read value to determine the generated symbol for the current iteration.

19. The system of claim 17, wherein the storage device comprises a multi level cell NAND storage.

20. The system of claim 17, wherein the bit reliability metrics comprise Log Likelihood Ratio (LLR) values, and wherein the decoding uses a low density parity check (LDPC) code algorithm to decode the LLR values.

* * * * *